United States Patent [19]

Zacho et al.

[11] 4,375,029

[45] Feb. 22, 1983

[54] CONTROL APPARATUS FOR THERMAL EQUIPMENT PARTICULARLY A HEAT ENGINE

[75] Inventors: Per G. Zacho, Nordborg; Kjeld Ahrendsen, Sonderborg, both of Denmark

[73] Assignee: Danfoss A/S, Nordborg, Denmark

[21] Appl. No.: 190,636

[22] Filed: Sep. 24, 1980

Related U.S. Application Data

[63] Continuation of Ser. No. 64,995, Aug. 9, 1979, abandoned, which is a continuation of Ser. No. 915,736, Jun. 15, 1978, abandoned.

[30] Foreign Application Priority Data

Jun. 24, 1977 [DE] Fed. Rep. of Germany ....... 2728380

[51] Int. Cl.$^3$ .............................................. H05B 1/02
[52] U.S. Cl. .................... 219/493; 219/511; 219/494; 219/501; 219/513
[58] Field of Search ............... 219/494, 492, 493, 497, 219/499, 501, 498, 513, 508; 60/527, 528, 530, 531

[56] References Cited

U.S. PATENT DOCUMENTS

| | | | |
|---|---|---|---|
| 3,335,263 | 8/1967 | Jewell et al. | 219/497 |
| 3,553,429 | 1/1971 | Nelson | 219/497 |
| 3,633,094 | 1/1972 | Clements | 219/497 |
| 3,702,921 | 11/1972 | Thelen | 219/499 |
| 3,784,843 | 1/1974 | Gustos | 219/497 |
| 4,081,936 | 4/1978 | Stove | 60/528 |
| 4,088,871 | 5/1978 | Coulmance et al. | 219/497 |

OTHER PUBLICATIONS

"How to Design and use Multivibrators", by Hall, Copyright 1974.

*Primary Examiner*—B. A. Reynolds
*Assistant Examiner*—M. Paschall
*Attorney, Agent, or Firm*—Wayne B. Easton

[57] ABSTRACT

The invention relates to control apparatus for heat actuated devices of the type having a heating resistor and a spring biased motor member movable in response to heat generated by the resistor. A source of rectified AC voltage for the heating resistor is regulated by a controlled rectifier in series with the resistor. There is a comparator circuit for comparing a desired setting with the actual position of the motor member and generating a continuously variable control signal of a value corresponding to the departure value. An ignition circuit for pulsing the controlled rectifier has inputs including the control signal, a half wave AC voltage and a time dependent decreasing signal. The ignition circuit has an input threshold below which pulses are generated and above which pulses are not generated.

1 Claim, 7 Drawing Figures

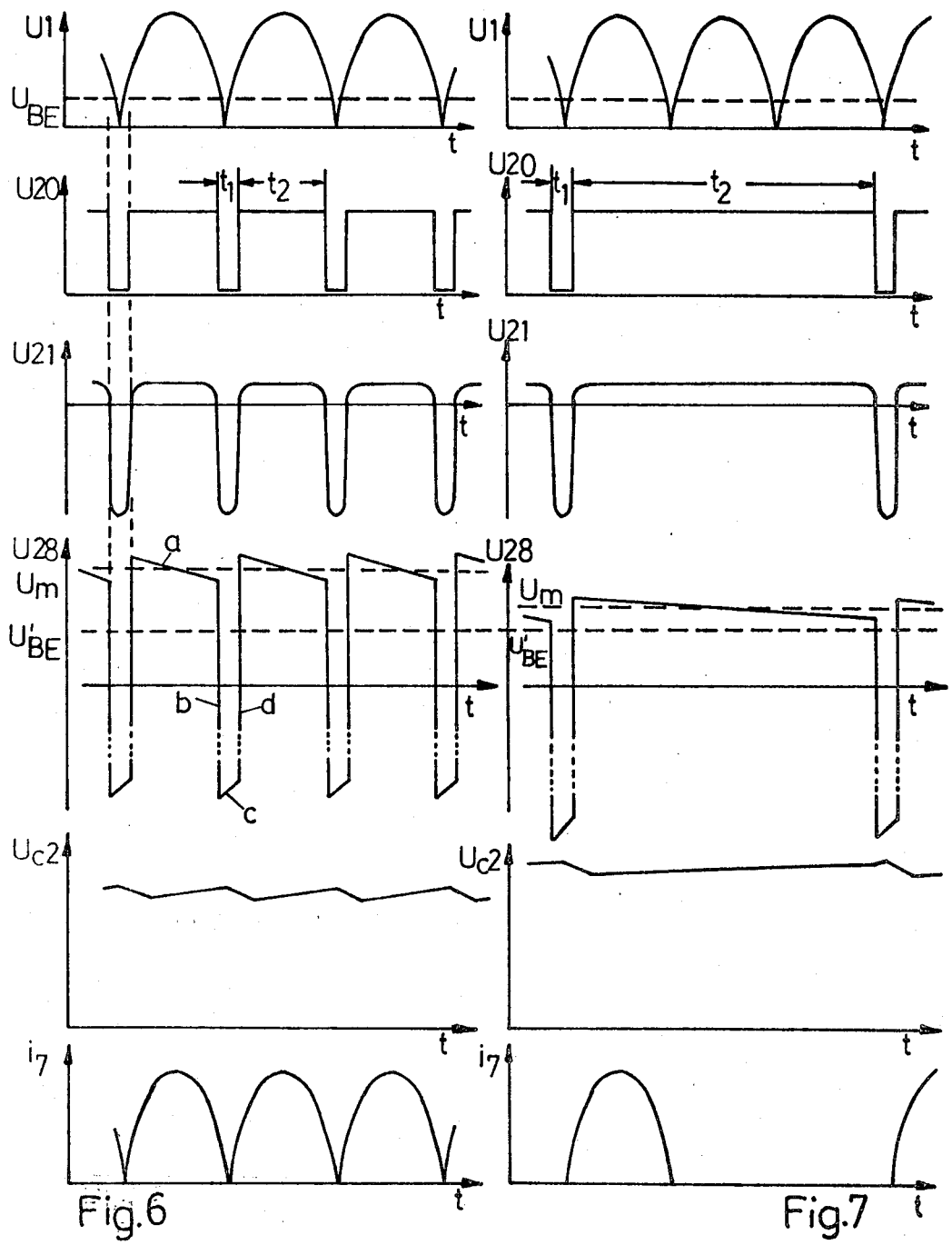

CONTROL APPARATUS FOR THERMAL EQUIPMENT PARTICULARLY A HEAT ENGINE

This application is a continuation of application Ser. No. 64,995, filed Aug. 9, 1979, now abandoned, which was a continuation application of Ser. No. 915,736, filed June 15, 1978, now abandoned.

The invention relates to a control apparatus for thermal equipment, particularly a heat engine which is fed by way of a controlled rectifier from a source of rectified AC voltage with electric power for heating or cooling in the form of half waves, comprising a comparator and ignition circuit which compares the actual value of a quantity depending on the thermal equipment, particularly the position of the heat engine, with the desired value and does or does not supply an ignition voltage to the control electrode of the controlled rectifier depending on the result of comparison.

Numerous thermal apparatuses are known in which for the purpose of maintaining a particular physical quantity power is supplied by way of an on-off switching apparatus. A typical example are heat engines or expansible substance servo-apparatuses in which the servo-element is to assume different positions as a function of the temperature of the expansible substance. In these thermal apparatuses, it is difficult accurately to conform the actual value of the physical quantity to the desired nominal value. Instead, the actual value oscillates quite considerably about the desired value in practice. The cause for this is that the thermal equipment works comparatively sluggishly and determination of zero control departure at which the power is switched on or off always takes place too late.

It has already been suggested to feed the thermal equipment with half waves of a rectified AC voltage and to use a controlled rectifier as the switching apparatus. Since the controlled rectifier must be re-ignited every time after passing zero, a decision may be made within very short time intervals as to whether or not there is to be a supply of power. The desired value signal fed to the comparator apparatus has a small AC voltage component superimposed on it, the result of which is that at zero control departure the ignition circuit delivers an ignition voltage during every alternate half wave. This considerably reduces oscillations of the actual value.

The invention is based on the problem of providing a control apparatus of the aforementioned kind, with the aid of which oscillations of the actual value about the desired value can be still further reduced.

This problem is solved according to the invention in that the comparator circuit delivers a continuously variable control signal and that the ignition circuit is designed so that, in the absence of a control signal at the start of each half wave, it produces an ignition voltage pulse, but with a rising control signal suppresses an increasing number of said pulses.

With this control apparatus, the supply of power to the thermal equipment is reduced with an increasing control signal. The more ignition voltage pulses are suppressed, the lower will be the number of half waves supplied to the thermal equipment. Although we are here concerned with a mere on-off control, this control acts in the manner of a continuous control because of the rapid succession of half waves and the inertia of the thermal equipment. Although only entire half waves can always be suppressed, smaller power fluctuations can also be verified, for example in that the controlled rectifier is alternately blocked for two or three half waves between individual half waves that are permitted to pass. On the whole it is therefore possible to supply the thermal equipment with such a finely metered amount of power that the dissipation of heat to the surroundings in the case of heatable thermal equipment is fairly accurately compensated and thus the actual value is kept relatively constant. Conditions are similar for coolable thermal equipment in relation to compensation of the heat absorbed by the surroundings.

It is particularly favourable if the ignition circuit comprises a bistable trigger stage which delivers the ignition voltage pulse in its first triggered condition and of which the second triggered condition is extensible in response to the control signal. Even slight elongation of the second trigger condition leads to suppression of each second half wave. A larger extension causes the controlled rectifier to be blocked over a larger number of half waves. Conversely, the first triggered condition can easily be dimensioned so that it has a sufficiently long period for delivering a reliably effective ignition voltage pulse.

In a preferred example, it is ensured that the trigger stage assumes its triggered conditions as a function of the size of its input voltage and that the input voltage consists of a main component proportional to the half waves of the rectified AC voltage and an additional component corresponding to a mixed signal composed of the control signal and a time-dependent decreasing signal. If only the main component is effective, the limiting voltage at which the trigger stage changes its triggered condition falls to just below the zero point and is exceeded just behind the zero point. The additional component can prevent falling below this limiting voltage as a function of the control current, whereby triggering to the condition at which ignition takes place is suppressed. The time-dependent decreasing signal is not sufficient to prevent falling below the limiting voltage after one half wave. However, the larger the control signal, the longer can the trigger stage remain in the triggered condition in which the controlled rectifier is blocked. With a very large control signal, blocking is maintained permanently.

It is also favourable if the control signal is formed by a control current and the time-dependent decreasing signal by the charging or discharging current of an R-C element. The two currents can very simply be superimposed to produce the additional component.

In a preferred embodiment, the trigger stage comprises a positive feedback branch containing at least the condenser of the R-C element. In this case the R-C element provided to produce the time-dependent decreasing signal also takes over a positive feedback function which accelerates triggering of the trigger element.

From the point of view of the circuitry, it is recommended that the trigger stage should comprise an input transistor of which the collector is connected by way of a collector resistor to the one pole of a DC voltage source, the emitter is connected to the other pole of the DC voltage source, and the base is connected to the output of the comparator circuit and by way of a summating resistor to a point fed by the half waves of the rectified AC voltage, as well as an output transistor of which the collector is connected by way of a collector resistor to the one pole of the DC voltage source and by way of a series R-C element to the base of the input transistor of which the emitter is connected by way of an emitter resistor bridging the control electrode-cathode path of the controlled rectifier to the other pole of the DC voltage source and the base is connected to the collector of the input transistor. It is therefore sufficient to have a very simple circuit construction to achieve the desired functions.

Further, the collector-emitter path of the output transistor may be bridged by a normally open limiting switch. This limiting switch responds when the actual value of the thermal equipment falls below a lower limiting value, whereupon the ignition voltage is permanently applied to the controlled rectifier.

Similarly, a normally closed limiting switch may be provided between the emitter of the output transistor and the emitter resistor. This limiting switch opens when the actual value of the thermal equipment exceeds an upper limiting value. The supply of power is then interrupted independently of the control departure.

With particular advantage the control signal changes linearly with the control departure in a proportional range. With smaller control departures, this results in a P regulation whereas beyond the proportional range there is either no power supply or a constant supply of power.

With advantage, it is ensured that the comparator circuit comprises a voltage divider with a fixed tapping and a potentiometer with a variable actual value voltage tapping which are disposed between the one and the other pole of the DC voltage source, and a transistor of which the emitter is connected to the voltage divider tapping, the collector is connected to the ignition circuit and the base is connected by way of a first resistor to a desired value voltage input, by way of a second resistor to the actual value voltage tapping and by way of a third resistor to the other pole of the DC voltage source. This results in a very simply constructed comparator circuit producing a control current as a function of the control departure.

Further, the desired value voltage input may be connectible to a second tapping of the voltage divider by way of a switch. This simple measure can reverse the functional dependence of the comparator circuit.

The invention will now be described in more detail with reference to an example illustrated in the drawings, wherein:

FIG. 6 shows voltage and current graphs with a small control current lying beyond the proportional range, and FIG. 7 shows voltage and current graphs with a larger control current lying within the proportional range.

Figure 1:
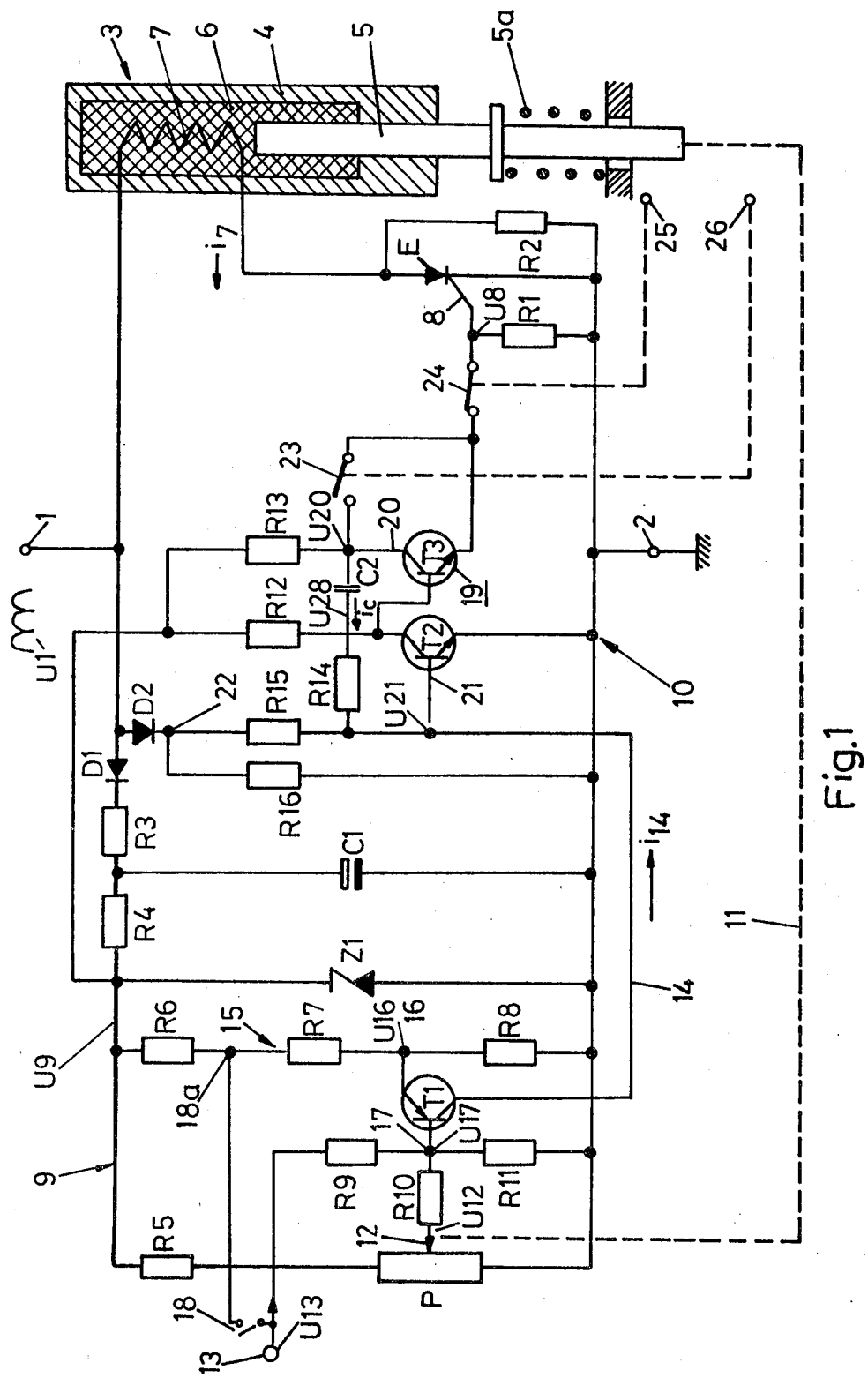
FIG. 1 is the circuit diagram of a control apparatus for a heat engine.

A pulsating DC voltage U1 is applied to the terminal 1. It consists of the rectified half waves of an AC voltage and can for example be obtained by four-way rectification of the mains voltage. The associated other terminal 2 is earthed. By means of this voltage U1, power is supplied to a heat engine 3. The latter comprises a housing 4 with a piston 5 biassed by a return spring 5a. Within the housing there is an expansible substance 6 which can be heated by means of a heating resistor 7. As a result of expansion of the expansible substance on an increase in temperature, the piston 5 is pushed outwardly; on cooling, it is pushed back by the spring 5a. The piston 5 retains its position if the thermal energy supplied to it is equal to the thermal energy dissipated to the surroundings. The control of energy supply takes place with the aid of a controlled rectifier E which is in series with the heating resistor 7 and always permits the current to pass during a half wave when the control electrode 8 is fed with an ignition voltage pulse from an ignition circuit 10. The cathode of the controlled rectifier is connected to the control electrode by way of a resistor R1 and to the anode by way of a resistor R2.

The control of the thermal energy takes place with the aid of a comparator circuit 9 and the ignition circuit 10. The actual value of the piston position is, as indicated by the broken line 11, introduced to the comparator circuit from the tapping 12 of a potentiometer P and there reproduced as actual value voltage U12. A desired value voltage U13 is supplied at a desired value voltage input 13. Depending on the control departure, a control current i14 is produced at the output 14 of this comparator circuit and the ignition circuit can deliver ignition pulses as a function of this current.

The comparator circuit 9 is supplied with the pulsating DC voltage U1 by way of a rectifier and an R-C smoothing element which consists of resistors R3 and R4 as well as a condenser C1 and is subsequently cut to a constant value with the aid of a Zener diode Z1. This DC voltage feeds a first series circuit consisting of a resistor R5 and the potentiometer P and a voltage divider 15 consisting of the resistors R6, R7 and R8. A transistor T1 of which the collector forms the output 14 of the comparator circuit 9 has its emitter connected to a tapping 16 of the voltage divider 15 and its base to a point 17 which is connected by way of a resistor R9 to the desired value voltage input 13, by way of a resistor R10 to the actual value voltage tapping 12 and by way of a summating resistor R11 to the connection 2. With the aid of a switch 18 the desired value voltage U13 can also be fed to a further tapping 18a of the voltage divider 15 to reverse the regulating dependence of the comparator circuit and thus the control function of the heat engine. Whereas the piston 5 moves outwardly under the influence of a certain constant desired value voltage U13 when the switch 18 is open, the motion is inwardly when the switch 18 is closed and the desired value voltage is the same.

A constant voltage U16 is obtained at the tapping 16. At the point 17 there is a base voltage U17 which is set as a function of the desired value voltage U13 and the actual value voltage U12. When the base voltage U17 falls below the fixed voltage U16 by about 0.6 V, which corresponds to the emitter-base path voltage drop, the transistor T1 becomes conductive. The more the base voltage U17 falls, the larger does the control current i14 become. When the switch 18 is closed, the desired value voltage U13 is imposed on the tapping 18a of the voltage divider 15 with the result that the voltage U16 fluctuates in proportion to the desired value voltage, whereby the aforementioned reversed control function is obtained.

The ignition circuit comprises a bistable trigger stage 19 having an input transistor T2 and an output transistor T3. The collectors of both transistors are fed with the DC voltage U9 of the comparator circuit 9 by way of a collector resistor R12 or R13, respectively. The emitter of the input transistor T2 is disposed at the connection 2, the emitter of the output transistor T3 is connected to this connection 2 by way of the resistor R1 determining the ignition voltage. The collector of the input transistor T2 is connected directly to the base of the output transistor T3, and the collector 20 of the output transistor T3 is connected to the base 21 of the input transistor T2 by way of a series R-C element consisting of a resistor R14 and a condenser C2. This base 21 to which the output 14 of the comparator circuit 9 is also connected further communicates by way of a summating resistor R15 with a point 22 which is fed with the pulsating DC voltage U1 by way of a diode D2 and which is connected to the connection 2 by way of a resistor R16.

With the aid of a limiting switch 23, a constant current can be fed by way of the resistor R1 and thus an ignition voltage U8 produced constantly and with the aid of a limiting switch 24 the current can be constantly interrupted by way of the resistor R1 and thus the ignition voltage U8 reduced to zero. Both limiting switches are controlled by sensors 25 or 26 which respond when the piston 5 has reached the inner or outer limiting position respectively. When these sensors act as pressure-responsive sensors, they can also become effective when the piston or the element actuated thereby meets an obstruction between its limiting positions.

Figure 2:
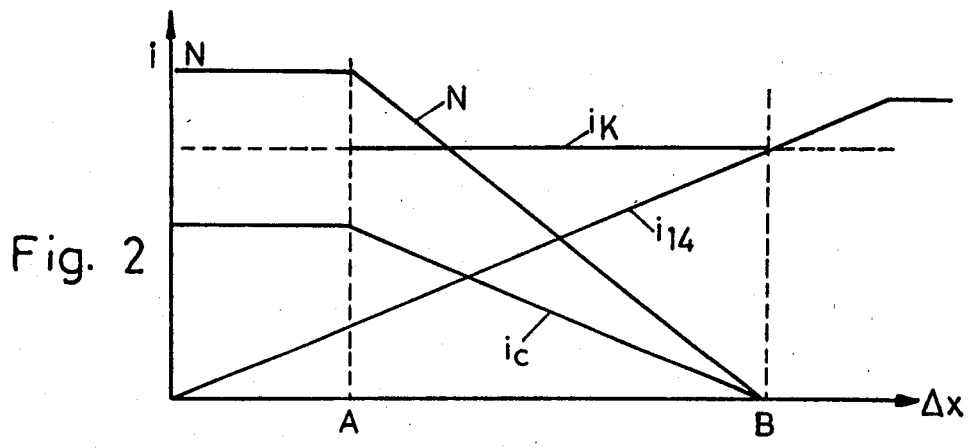
FIG. 2 is a diagram showing the control current, condenser current and power as a function of the control departure.

This circuit results in the manner of operation shown in FIG. 2. Within a proportional range of the control departure Δx determined by the limits A and B, i.e. the difference between the set desired value and the actual value reached by the heat engine, the energy N supplied by the heating resistor 7 drops from a maximum value to zero. The control takes place as a function of the linearly increasing control current i14. Within the proportional range, each value of the control current is associated with a charging current $i_o$ of the condenser such that the sum of both values results in a constant current $i_k$. This will be explained hereinafter. The function will first be considered where the control current i14 is so small that it still has no influence on the ignition circuit. The base 21 of the input transistor T2 is primarily controlled by the voltage U1, i.e. the half waves of the rectified AC voltage. Whenever this voltage approaches the zero point and the base voltage U21 falls below the base-emitter voltage drop $U_{BE}$ of about 0.6 V, the input transistor T2 blocks; the output transistor T3 becomes conductive and the control electrode 8 of the controllable rectifier E has an ignition pulse fed to it so that up to the end of the half wave a heating current i7 flows through the heating resistor 7. Shortly after commencement of the next half wave of the voltage U1, the base-emitter voltage drop $U_{BE}$ is exceeded so that the trigger stage 19 returns to the original condition again. This results in the manner of operation shown in FIG. 6, where on commencement of each half wave an ignition pulse of length t1 is delivered so that the heating resistor 7 is fed with a heating current i7 during each half wave and thus the maximum energy N is delivered. The blocking times t2 between these ignition pulses are comparatively short.

Triggering is supported by the R14-C2 element in the positive feedback branch. When the output transistor T3 becomes conductive, the voltage U20 at the collector 20 of the output transistor T3 drops from the value of the DC voltage U9 to practically zero. The voltage U28 drops to the same extent at the other electrode of the condenser C2 and the base voltage U21 drops to a corresponding extent. This leads to sudden triggering. Similar conditions are obtained when triggering back.

If the control current i14 is so large that it lies beyond the limit B of the proportional range, it can feed the input transistor T2 independently of the voltage U1 with such a base current $i_B$ that it is constantly conductive. The output transistor T3 then remains constantly blocked; no ignition pulses and thus no thermal energy are delivered.

Within the proportional range, the control current i14 is not alone sufficient to keep the input transistor T2 conductive if the half wave voltage U1 approaches zero. An adequately strong charging current $i_c$ of the condenser C2 must be added. Since this charging current decreases with time, one or a few half waves of the heating current i7 are suppressed each time. This will be explained hereinafter.

Figure 3:
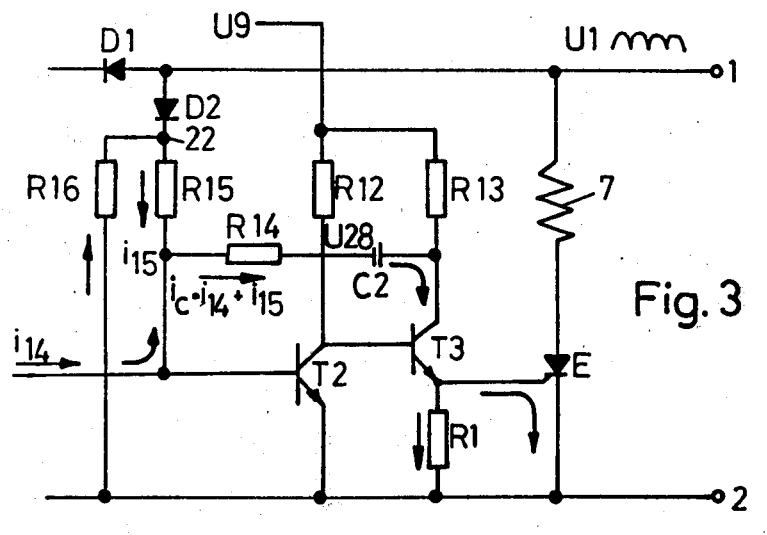
FIG. 3 illustrates the ignition circuit in its one triggered condition with arrows indicating the discharge of the condenser.

During each time t1 in which the output transistor T3 is conductive and delivers an ignition pulse, the condenser C2 is discharged. As will be evident from FIG. 3, the discharge current $i'_c$ flows by way of the collector-emitter path of the transistor T3, by way of two parallel branches of which the one is formed by the resistor R1 and the other by the control electrode-cathode path of the controllable rectifier E, by way of further parallel branches of which the one is formed by the resistors R16 and R15 and the other by the resistor R8 and the emitter-collector path of the transistor T1 (FIG. 1), and by way of the resistor R14.

Figures 4, 5:
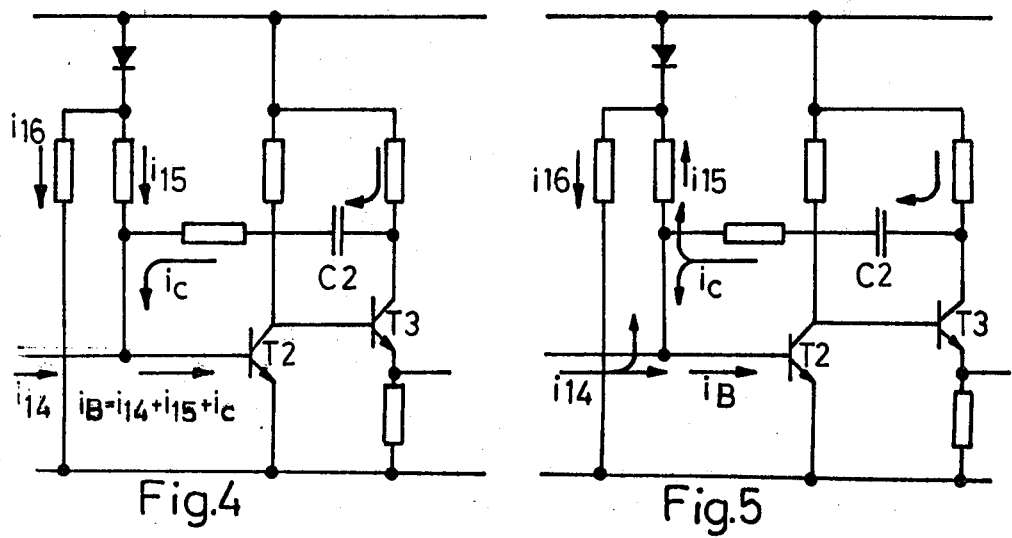
FIG. 4 shows the ignition circuit in its other triggered condition with arrows showing the charging of the condenser, the control current being so small that it still lies beyond the proportional range of FIG. 2.
FIG. 5 is the same representation as FIG. 4 but with a larger control current lying within the proportional range.

As soon as the output transistor T3 is blocked again, which occurs in the absence of the control current i14 at the latest, when the half wave voltage U1 exceeds a value corresponding to the base-emitter voltage $U_{BE}$ of the input transistor T2, the condenser C2 is charged by the DC voltage U9 by way of the resistor R13, the resistor R14 and the base-emitter path of the transistor T2, the charging current being $i_c$. As shown in FIG. 4, with a very small control current i14 for the base current $i_B$ which must flow in the conductive condition of the transistor T2, the formula $i_B = i14 + i15 + i_c$ applies, wherein i15 is the proportion of current flowing through the resistor R15 by reason of the voltage U1. When i15 becomes zero towards the end of the half wave, the residual sum of $i14 + i_c$ is not sufficient to keep the base current $i_B$ at the required value. The transistor C2 blocks and an ignition pulse is delivered by way of the transistor T3.

When the transistor T2 is to be kept conductive at the end of the half wave, the sum $i14 + i_c$ must reach a constant value $i_k$ which is larger than the required base current $i_B$ because the series circuit of the resistors R15 and R16 is parallel to the base-emitter path of the transistor T2 and an additional current $i15 = i16$ therefore flows through this series circuit. These conditions are shown in FIG. 5. The smaller the control current i14, the larger must be the charging current $i_c$ to keep the transistor T2 in the conductive state at the end of the half wave.

Within the proportional range, stable conditions set in automatically at which the charging current $i_c$ is adequate to meet the conditions represented in FIG. 2. If the control current 14 increases and thus the transistor T2 is kept conductive beyond the end of the half wave, there is longer charging of the condenser C2 so that the voltage $U_{C2}$ thereat is increased. However, this higher condenser voltage corresponds to a lower charging current.

If one measures the voltage U28 relatively to earth, one obtains the voltage course represented in the fourth line of FIGS. 6 and 7. The voltage drops along the line a on charging the condenser. When the transistor T3 becomes conductive, there is a jump b because the voltage U20 drops from the value of the voltage U9 to about 0.6 V, which corresponds to the voltage drop at the transistor T3 in series with the voltage drop at the control path of the rectifier E. The jump b is shown to a much reduced scale. During subsequent discharging, the voltage U28 increases along the line c. On blocking of the transistor T3, there is a jump d, whereupon the cycle commences again. Since the amount of charge delivered during the time interval t1 must be equal to the amount of charge taken up during the time interval t2, a comparatively high charging current $i_c$ occurs in this manner of operation. The voltage $U_{C2}$ at the condenser is comparatively low; the mean voltage $U_m$ of the voltage U28 is comparatively high.

If, now, the condenser C2 is charged to a higher voltage $U_{C2}$ by increasing the control current 14 (FIG. 7), one obtains a higher voltage $U_{C2}$ at the condenser, a lower mean voltage $U_m$ and a lower charging current $i_c$. Since the amount of charge that is discharged during the time t1 remains substantially the same, a longer charging period t2 is required because of the lower charging current for supplying the same amount of charge. Only at the end of this longer period does one obtain the condition $i14+i_c<i_k$, so that the transistor T2 is blocked at the end of the half wave and an ignition pulse is delivered.

The energy curve N is shown as continuous even though within short time intervals it can only be shown as whole number conditions between passed half waves and suppressed half waves. With the operation as described, however, alternately different numbers of half waves, e.g. first n half waves and subsequently n+1 half waves can be suppressed or allowed to pass with a given control current i14. In this way the energy curve N can be reproduced very accurately.

The size of the condenser C2 has a comparatively small influence on the circuit because its operation is always such that the amount of charge lost during discharging is equal to the charge taken up during subsequent charging. In relation to the control current i14, it always acts in the sense of a negative feedback (large control current=lower charging current) and in relation to the trigger function it acts in the sense of a positive feedback. With an increase in size of this condenser, the control range can however be increased.

It can be shown that the size of the condenser C2 has no influence on the function of the circuit. As long as it has a certain minimum value, it can therefore be selected at will.

In one embodiment, a pulsating DC voltage U1 with an amplitude of 24 V and a constant DC voltage U9 of 12 V was used. U16 amounted to 8.5 V. The same value was obtained at the point 17 when there was a desired value voltage U13 of 11 V and an actual value voltage U12 of 6 V. If the desired value voltage U13 is set to its lower limiting value of 6 V, a corresponding control current i14 is delivered with the result that the energy N is reduced or interrupted so that the heat engine 3 can cool off and thereby displace the tapping 12 upwardly until the control departure is practically compensated and the control current i14 is reduced. If the desired value voltage U13 is brought to an upper limiting value of 16 V, the transistor T1 blocks. The heat engine 3 is heated constantly whereby the tapping 12 is moved downwardly until a certain control current can flow in the region of the control departure zero and the energy N is reduced.

At a voltage U9 of 12 V, the positive mean value $U_m$ of the voltage U28 was between 0.6 V (this corresponds to a negative mean value of −11.4 V) and 1.1 V (this corresponds to a negative mean value of −10.9 V). These changes were sufficient to change the charging current $i_c$ to the desired extent. The switch 18 has the purpose of reversing the function of the engine with the input signal U13 unchanged. If the switch is open, the piston 5 and tapping 12 of the potentiometer P move downwardly with an input voltage of 16 V. If the switch 18 is closed under the same assumptions, the piston 5 and tapping 12 move upwardly.

The latter is for example of interest if, for example in an air-conditioning installation, a refrigerating valve is to be actuated instead of a heating valve. Also, for example two throttle flaps each having a servo-motor can be moved in opposite senses as a function of a single input signal.

What is claimed is:

1. Control apparatus for a heat actuated device of the type having a heating resistor and a spring biased motor member movable in response to heat generated by said resistor, comprising, a controlled rectifier in series with said resistor, a source of full wave rectified voltage for said heating resistor controlled transistor having the emitter thereof connected to said rectifier to effect triggering thereof, said input transistor effecting a turning on and triggering occurrences of said output transistor upon each turning off of said input transistor, a first signal means derived from said source of voltage connected through resistor means to the base of said input transistor effective alone in the absence of other signals to effect turning said input transistor on and off during each half cycle thereof, second signal means comprising R-C circuit means connected to the collector of said output transistor and said base of said input transistor providing a time-dependent decreasing current signal subsequent to each of said triggering occurrences for delaying the turning off of said input transistor, third signal means connected to said motor member for producing a current signal corresponding to the actual position of said motor member, said third signal means being connected to said base of said input transistor to supplement said first and second signals to effect a delay of said triggering for a number of said half cycles corresponding to the instant position of said motor member, said first signal means derived from said full wave rectified voltage providing synchronization whereby said input transistor is turned on during every half cycle thereof to provide cyclical interruption of said triggering.

* * * * *